United States Patent
Kowase (10) Patent No.: US 9,934,909 B2
(45) Date of Patent: Apr. 3, 2018

(54) MULTILAYER CERAMIC CAPACITOR

(71) Applicant: TAIYO YUDEN CO., LTD., Taito-ku, Tokyo (JP)

(72) Inventor: Yusuke Kowase, Takasaki (JP)

(73) Assignee: TAIYO YUDEN CO., LTD., Tokyo (JP)

( * ) Notice: Subject to any disclaimer, the term of this patent is extended or adjusted under 35 U.S.C. 154(b) by 0 days.

(21) Appl. No.: 15/345,269

(22) Filed: Nov. 7, 2016

(65) Prior Publication Data
US 2017/0162326 A1 Jun. 8, 2017

(30) Foreign Application Priority Data

Dec. 7, 2015 (JP) ................................. 2015-238558

(51) Int. Cl.
| | |
|---|---|
| H01G 4/30 | (2006.01) |
| H01G 4/12 | (2006.01) |
| H01G 4/232 | (2006.01) |
| H01G 4/012 | (2006.01) |
| H01G 2/06 | (2006.01) |

(52) U.S. Cl.
CPC .............. *H01G 4/30* (2013.01); *H01G 2/065* (2013.01); *H01G 4/012* (2013.01); *H01G 4/12* (2013.01); *H01G 4/232* (2013.01)

(58) Field of Classification Search
CPC .......... H01G 4/30; H01G 4/065; H01G 4/012; H01G 4/12; H01G 4/232
USPC ...................................................... 361/321.2
See application file for complete search history.

(56) References Cited

U.S. PATENT DOCUMENTS

| | | | | | |
|---|---|---|---|---|---|
| 4,661,884 | A | * | 4/1987 | Seaman | .................... H01G 4/30 29/25.42 |
| 2014/0326494 | A1 | * | 11/2014 | Chung | .................... H01G 4/018 174/260 |
| 2017/0162327 | A1 | | 6/2017 | Mizuno | |
| 2017/0162330 | A1 | | 6/2017 | Kan | |

FOREIGN PATENT DOCUMENTS

JP 2014160693 A 9/2014

OTHER PUBLICATIONS

The specification with the drawings of co-pending U.S. Appl. No. 15/362,339, filed Nov. 28, 2016, by the same applicatant.
The specification with the drawings of co-pending U.S. Appl. No. 15/369,675, filed Dec. 5, 2016, by the same applicatant.

* cited by examiner

*Primary Examiner* — Jenny L Wagner
*Assistant Examiner* — Michael P McFadden
(74) *Attorney, Agent, or Firm* — Law Office of Katsuhiro Arai (57) ABSTRACT

In an embodiment, a multilayer ceramic capacitor 10 has the first external electrode 12 and second external electrode 13 provided with a space between them on the other height-direction surface f6 of the capacitor body 11 in the length direction, where the width Wa of the other height-direction surface f6 of the capacitor body 11 is smaller than the width W of the one height-direction surface f5. The multilayer ceramic capacitor can improve yield and help reduce cost by allowing several of the conditions to be found non-defective in the appearance inspection.

10 Claims, 6 Drawing Sheets

MULTILAYER CERAMIC CAPACITOR

BACKGROUND

Field of the Invention

The present invention relates to a multilayer ceramic capacitor constituted by a capacitor body of roughly rectangular solid shape, which has a first external electrode and a second external electrode provided with a space between them on one of the two height-direction surfaces of the capacitor body in the length direction.

Description of the Related Art

Figure 1A:
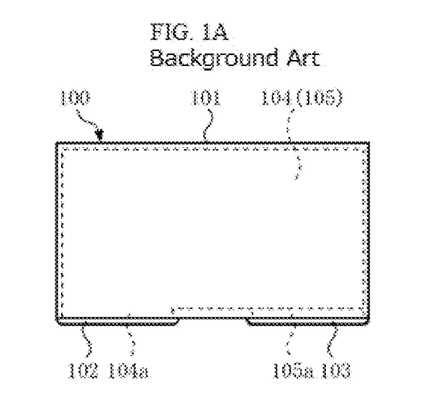
Figure 1B:
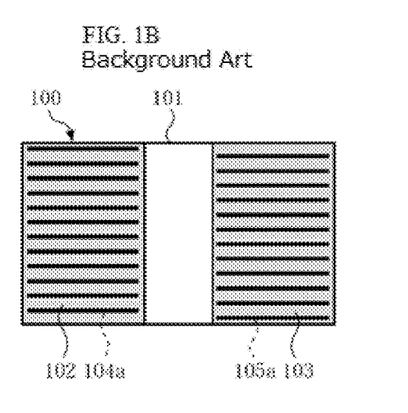
FIG. 1B is a drawing that shows the multilayer ceramic capacitor in FIG. 1A as viewed from one of its two height-direction surfaces.

Multilayer ceramic capacitors 100 like the one shown in FIGS. 1A and 1B are known as a way to make a multilayer ceramic capacitor smaller while increasing its capacitance at the same time (e.g., those disclosed in Japanese Patent Laid-open No. 2014-160693, the disclosure of which is incorporated herein by reference to the extent consistent with the instant disclosure). FIG. 1A is a drawing that shows a multilayer ceramic capacitor 100 as viewed from one of its two width-direction surfaces, while FIG. 1B is a drawing that shows the multilayer ceramic capacitor 100 in FIG. 1A as viewed from one of its two height-direction surfaces. It should be noted that, for the purpose of convenience, FIG. 1B is drawn in such a way that the exposed parts (refer to the bold lines) of the lead parts 104a, 105a described later are visible from the outside of the first external electrode 102 and second external electrode 103, respectively.

The multilayer ceramic capacitor 100 shown in FIGS. 1A and 1B is constituted by a capacitor body 101 of roughly rectangular solid shape, which has a first external electrode 102 and a second external electrode 103 provided with a space between them on one of the two height-direction surfaces of the capacitor body 101 in the length direction. Also, the capacitor body 101 has a built-in capacitive part comprising multiple first internal electrode layers 104 and multiple second internal electrode layers 105 stacked alternately in the width direction with dielectric layers in between. Furthermore, a lead part 104a of each first internal electrode layer 104 is exposed on one of the two height-direction surfaces of the capacitor body 101, with this exposed part connected independently and electrically to the first external electrode 102, while a lead part 105a of each second internal electrode layer 105 is exposed on one of the two height-direction surfaces of the capacitor body 101, with this exposed part connected independently and electrically to the second external electrode 103.

Because its first external electrode 102 and second external electrode 103 are provided on one of the two height-direction surfaces of the capacitor body 101, this multilayer ceramic capacitor 100 can prevent, to the maximum extent possible, the external dimensions of the capacitor body 101 from being limited by the first external electrode 102 and second external electrode 103, compared to when the external electrodes have an L-shape, horizontal U-shape, quadrangular cylinder shape with bottom, or the like.

This means that, even when the external dimensions of the multilayer ceramic capacitor 100 are small, the capacitor body 101 can be designed with the maximum possible external dimensions, which in turn allows the contour dimensions of the first internal electrode layer 104 and second internal electrode layer 105 to increase, respectively, thereby increasing the area of the internal electrode layers facing each other, and achieving a larger capacitance as a result.

With the multilayer ceramic capacitor 100 shown in FIGS. 1A and 1B, ideally the positions on one of the two height-direction surfaces of the capacitor body 101 where the first external electrode 102 and second external electrode 103 are formed, as well as their contour shapes, correspond to the forming positions and contour shapes shown in FIG. 1B.

However, the present inventors realized the following problems. That is, it is technically difficult to form both the first external electrode 102 and second external electrode 103 on one of the two height-direction surfaces of the capacitor body 101, and particularly when the external dimensions of the capacitor body 101 become smaller, the frequency at which the forming positions and contour shapes of the first external electrode 102 and second external electrode 103 differ from the ideal forming positions and contour shapes, respectively, becomes higher.

FIGS. 2A through 3D each provide drawings that explain conditions where the forming positions and contour shapes of the first external electrode 102 and second external electrode 103 differ from the ideal forming positions and contour shapes, respectively (refer to FIG. 1B). It should be noted that, while FIGS. 2A through 3D each illustrate the first external electrode 102 alone for the purpose of convenience, the modes in which the forming position and contour shape of the second external electrode 103 differ are the same as those shown in each of FIGS. 2A through 3D. Also, FIGS. 2A through 3D are each drawn in such a way that the exposed part (refer to the bold line) of each lead part 104a is visible from the outside of the first external electrode 102. Furthermore, while the contour shape of the first external electrode 102 in FIGS. 2A through 2D, and those in FIGS. 3A through 3D match the contour shape of the first external electrode 102 shown in FIG. 1B for the purpose of convenience, it goes without saying that each contour shape may differ from the contour shape of the first external electrode 102 shown in FIG. 1B.

Figure 2A:
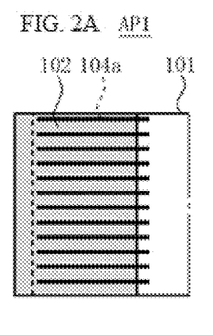
FIGS. 2A through 2D are drawings that explain conditions where the forming positions and contour shapes of the first external electrode and second external electrode differ from the ideal forming positions and contour shapes, respectively.
Figure 2B:
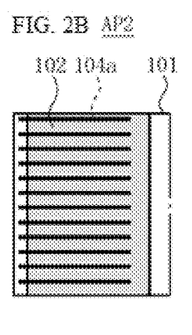
Figure 2C:
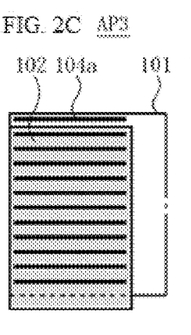
Figure 2D:
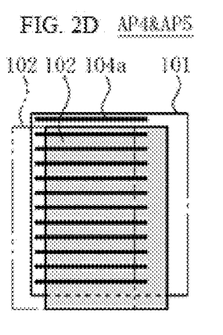

FIG. 2A shows a condition AP1 where the first external electrode 102 is displaced significantly outward in the length direction and the exposed parts of all lead parts 104a are partially revealed, FIG. 2B shows a condition AP2 where the first external electrode 102 is displaced significantly inward in the length direction and the exposed parts of all lead parts 104a are partially revealed, FIG. 2C shows a condition AP3 where the first external electrode 102 is displaced significantly outward in the width direction and one of the exposed parts of all lead parts 104a is revealed, and FIG. 2D shows a condition AP4 where the first external electrode 102 is displaced significantly inward in the length direction and outward in the width direction and one of the exposed parts of all lead parts 104a is revealed and the other exposed parts are partially revealed, as well as a condition AP5 where the first external electrode 102 is displaced significantly outward in the length direction and also outward in the width direction and one of the exposed parts of all lead parts 104a is revealed and the other exposed parts are partially revealed (refer to the two-dot chain line).

Figure 3A:
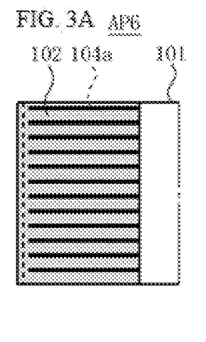
FIGS. 3A through 3D are drawings that explain conditions where the forming positions and contour shapes of the first external electrode and second external electrode differ from the ideal forming positions and contour shapes, respectively.
Figure 3B:
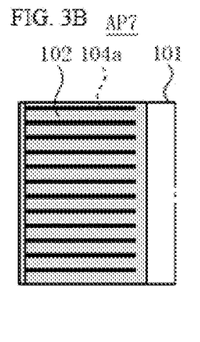
Figure 3C:
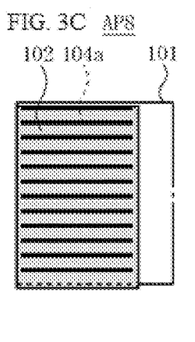
Figure 3D:
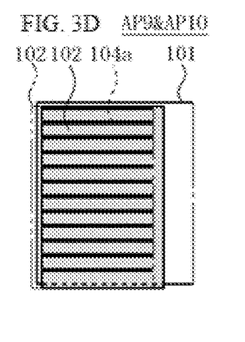

Also, FIG. 3A shows a condition AP6 where the first external electrode 102 is displaced slightly outward in the length direction but the exposed parts of all lead parts 104a are covered by the first external electrode 102, FIG. 3B shows a condition AP7 where the first external electrode 102 is displaced slightly inward in the length direction but the exposed parts of all lead parts 104a are covered by the first external electrode 102, FIG. 3C shows a condition AP8 where the first external electrode 102 is displaced slightly outward in the width direction but the exposed parts of all lead parts 104a are covered by the first external electrode 102, and FIG. 3D shows a condition AP9 where the first external electrode 102 is displaced slightly inward in the length direction and outward in the width direction but the exposed parts of all lead parts 104a are covered by the first external electrode 102, as well as a condition AP10 where the first external electrode 102 is displaced slightly outward in the length direction and also outward in the width direction but the exposed parts of all lead parts 104a are covered by the first external electrode 102 (refer to the two-dot chain line).

Incidentally, an appearance inspection of the forming positions and contour shapes of the first external electrode 102 and second external electrode 103 formed on one of the two height-direction surfaces of the capacitor body 101, respectively, has been performed using an image-processing apparatus. In the appearance inspection, those samples with the exposed parts of all lead parts 104a, 105a not covered by the first external electrode 102 and second external electrode 103, respectively, are found defective, while those samples whose first external electrode 102 and second external electrode 103 are projecting outward from at least one of the judgment criterion length and width, respectively, are found defective. It should be noted that, with the capacitor body 101 shown in FIGS. 1A and 1B, the two height-direction surfaces have the same length and width and therefore the criterion length and criterion width described below are different from the length and width of one of the two height-direction surfaces, or from the length and width of the other of the two height-direction surfaces.

In other words, the five conditions AP1 through AP5 explained using FIGS. 2A through 2D are found defective because the exposed parts of all lead parts 104a, 105a are not covered by the first external electrode 102 and second external electrode 103, respectively. Of the five conditions AP6 through AP10 explained using FIGS. 3A through 3D, on the other hand, the condition AP7 is found non-defective because neither the first external electrode 102 nor second external electrode 103 is projecting outward from either the criterion length or criterion width. The remaining four conditions AP6 and AP8 through AP10 are found defective because the first external electrode 102 and second external electrode 103 project outward from at least one of the criterion length and criterion width, respectively.

Among the five conditions AP6 through AP10 explained using FIGS. 3A through 3D, however, the four conditions AP6 and AP8 through AP10, excluding the condition AP7, are extremely unlikely to present problems in function or in use because, although the first external electrode 102 and second external electrode 103 are projecting slightly outward from at least one of the criterion length and criterion width, respectively, the exposed parts of all lead parts 104a, 105a are covered by the first external electrode 102 and second external electrode 103, respectively.

In other words, applying to a multilayer ceramic capacitor such ingenious ideas that allow several of the four conditions AP6 and AP8 through AP10 that are extremely unlikely to present problems in function and in use, to be found non-defective in the appearance inspection, should improve yield and help reduce cost.

Any discussion of problems and solutions involved in the related art (particularly those discussed above) has been included in this disclosure solely for the purposes of providing a context for the present invention, and should not be taken as an admission that any or all of the discussion were known at the time the invention was made.

SUMMARY

An object of the present invention is to provide a multilayer ceramic capacitor that can improve yield and help reduce cost by allowing several of the conditions where the exposed parts of all lead parts of the first internal electrode layers and second internal electrode layers are covered by the first external electrode and second external electrode, respectively, to be found non-defective in the appearance inspection, although at least one of the first external electrode and second external electrode is projecting slightly outward from one of the two height-direction surfaces of the capacitor body.

To achieve the aforementioned object, the multilayer ceramic capacitor pertaining to the present invention is a multilayer ceramic capacitor constituted by a capacitor body of roughly rectangular solid shape, which has a first external electrode and a second external electrode provided with a space between them on one of the two height-direction surfaces of the capacitor body in the length direction, wherein: the capacitor body has a built-in capacitive part comprising multiple first internal electrode layers and multiple second internal electrode layers stacked alternately in the width direction with dielectric layers in between; the lead part of each of the multiple first internal electrode layers is exposed on one of the two height-direction surfaces, with this exposed part connected independently and electrically to the first external electrode; the lead part of each of the multiple second internal electrode layers is exposed on one of the two height-direction surfaces, with this exposed part connected independently and electrically to the second external electrode; and the width of one of the two height-direction surfaces of the capacitor body is smaller than the width of the other of the two height-direction surfaces.

According to the present invention, a multilayer ceramic capacitor can be provided that can improve yield and help reduce cost by allowing several of the conditions where the exposed parts of all lead parts of the first internal electrode layers and second internal electrode layers are covered by the first external electrode and second external electrode, respectively, to be found non-defective in the appearance inspection, although at least one of the first external electrode and second external electrode is projecting slightly outward from one of the two height-direction surfaces of the capacitor body.

For purposes of summarizing aspects of the invention and the advantages achieved over the related art, certain objects and advantages of the invention are described in this disclosure. Of course, it is to be understood that not necessarily all such objects or advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other objects or advantages as may be taught or suggested herein.

Further aspects, features and advantages of this invention will become apparent from the detailed description which follows.

BRIEF DESCRIPTION OF THE DRAWINGS

These and other features of this invention will now be described with reference to the drawings of preferred embodiments which are intended to illustrate and not to limit the invention. The drawings are greatly simplified for illustrative purposes and are not necessarily to scale.

FIG. 1A is a drawing that shows a conventional multilayer ceramic capacitor as viewed from one of its two width-direction surfaces, while

FIG. 5A is a drawing that shows the multilayer ceramic capacitor in FIG. 4 as viewed from one length-direction surface, while

FIG. 8A is a section view of FIG. 5A along line S3-S3, while

DESCRIPTION OF THE SYMBOLS

10—Multilayer ceramic capacitor, 11—Capacitor body, f1—One length-direction surface of the capacitor body, f2—Other length-direction surface of the capacitor body, f3—One width-direction surface of the capacitor body, f4—Other width-direction surface of the capacitor body, f5—One height-direction surface of the capacitor body, f6—Other height-direction surface of the capacitor body, 11a—Tapered part of the capacitor body, f3a, f4a—Width-direction outer surface of the tapered part, 11b—Concaved part of the tapered part, 12—First external electrode, 13—Second external electrode, 14—First internal electrode layer, 14a—Lead part of the first internal electrode layer, 15—Second internal electrode layer, 15a—Lead part of the second internal electrode layer.

DETAILED DESCRIPTION OF EMBODIMENTS

First, the structure of a multilayer ceramic capacitor 10 to which the present invention is applied, is explained using FIGS. 4 through 9. It should be noted that, while in FIGS. 7A and 7B there are 12 each of the first internal electrode layers 14 and second internal electrode layers 15 described below, this is only for the purpose of illustration and does not limit the number of the first internal electrode layers 14 or that of the second internal electrode layers 15. In other words, the number of the first internal electrode layers 14 and that of the second internal electrode layers 15 may be 13 or more, or 11 or less.

Figure 4:
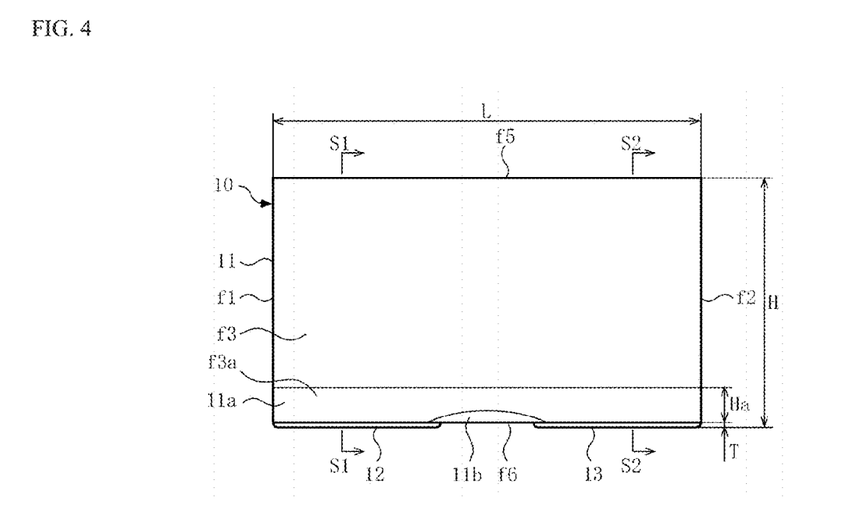
FIG. 4 is a drawing that shows a multilayer ceramic capacitor to which the present invention is applied, as viewed from one width-direction surface.
Figure 5A:
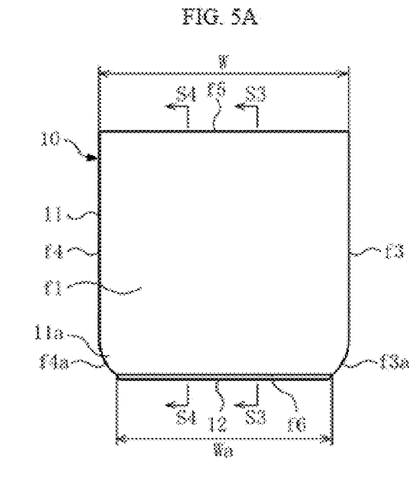
Figure 5B:
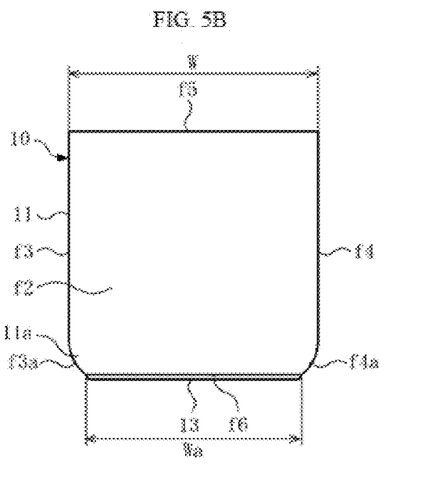
FIG. 5B is a drawing that shows the multilayer ceramic capacitor in FIG. 4 as viewed from the other length-direction surface.
Figure 6:
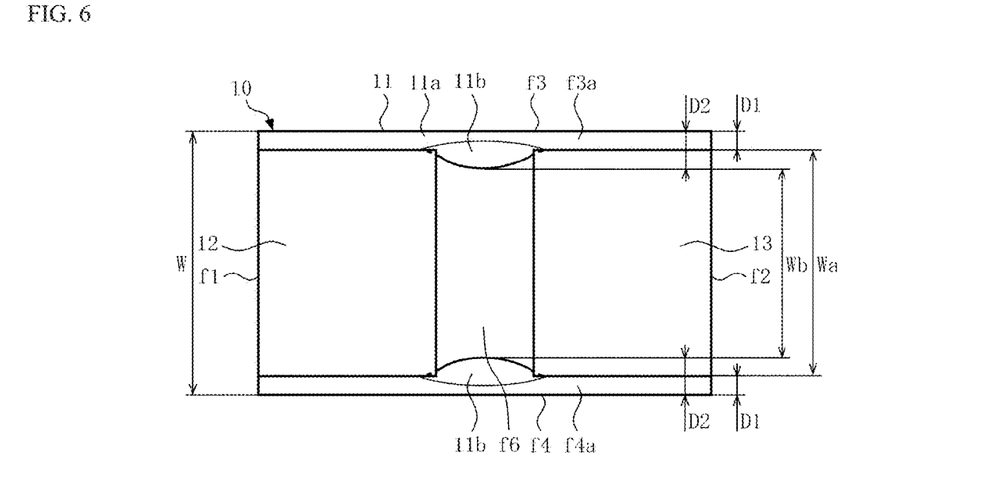
FIG. 6 is a drawing that shows the multilayer ceramic capacitor in FIG. 4 as viewed from the other height-direction surface.

As shown in FIGS. 4 through 6, the multilayer ceramic capacitor 10 has a capacitor body 11 of roughly rectangular solid shape, as well as a first external electrode 12 and a second external electrode 13 provided on one of the two height-direction surfaces (the other height-direction surface f6 as described below) of the capacitor body 11, and its external dimensions are specified by length L, width W (the width of the one height-direction surface f5 as described below) and height H. It should be noted that, while the multilayer ceramic capacitor 10 shown in FIGS. 4 through 6 (and also in FIGS. 7A through 9) is drawn based on a prototype whose length L is 1200 μm, width W is 700 μm and height H is 700 μm (all are reference dimensions in design that do not include tolerance), the values of length L, width W and height H are not limited in any way so long as "Length L>Width W=Height H" is satisfied. In addition, while the multilayer ceramic capacitor 10 shown in FIGS. 4 through 6 (and also in FIGS. 7A through 9) has external dimensions that satisfy "Length L>Width W=Height H," its external dimensions may be those that satisfy "Length L>Width W>Height H" or "Length L>Height H>Width W."

As shown in FIGS. 4 through 6, the capacitor body 11 has one length-direction surface f1 and the other length-direction surface f2 that are roughly parallel to each other, one width-direction surface f3 and the other width-direction surface f4 that are roughly parallel to each other, and one height-direction surface f5 and the other height-direction surface f6 that are roughly parallel to each other. Also, at a position adjoining the other height-direction surface f6 of the capacitor body 11, a tapered part 11a is provided whose width gradually decreases toward the other height-direction surface f6 over the entire part in the length direction. Additionally, one width-direction outer surface f3a of the tapered part 11a continues steplessly to the one width-direction surface f3 and is constituted by an outwardly bulging curved surface, while the other width-direction outer surface f4a of the tapered part 11a continues steplessly to the other width-direction surface f4 and is constituted by an outwardly bulging curved surface. Furthermore, the tapered part 11a has, at the length-direction center of the width-direction outer surface f3a and also at the length-direction center of the width-direction outer surface f4a, a concaved part 11b that extends from midway through the width-direction outer surface f3a or f4a in the height direction to the other height-direction surface f6, where each concaved part 11b continues steplessly to the width-direction outer surface f3a or f4a and is constituted by an inwardly concaving curved surface. It should be noted that the width-direction outer surfaces f3a, f4a of the tapered part 11a, although they can be planar surfaces, are preferably curved surfaces that bulge outward. Also, the symbol Ha in FIG. 4 represents the height-direction dimension of the tapered part 11a with reference to the other height-direction surface f6 of the capacitor body 11. Additionally, the symbol T in FIG. 4 represents the thickness of the first external electrode 12 and that of the second external electrode 13 with reference to the other height-direction surface f6 of the capacitor body 11.

Figure 9:
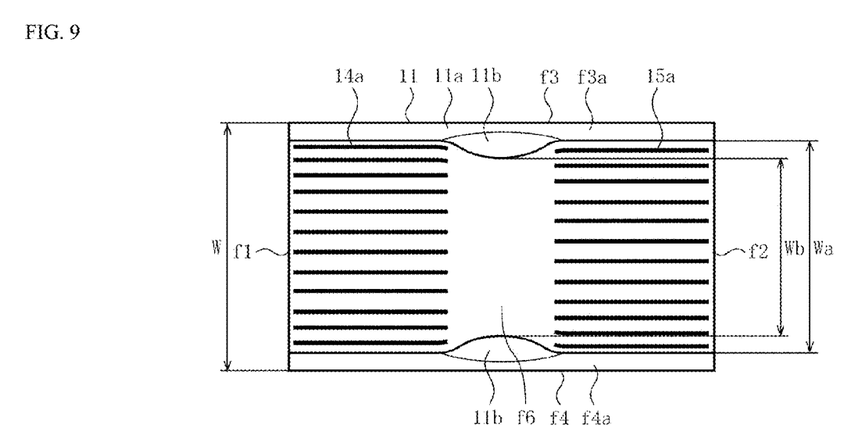
FIG. 9 is the same as FIG. 6, except that the first external electrode and second external electrode have been removed.

In other words, the other height-direction surface f6 of the capacitor body 11 has an hourglass shape with a constricted center in the length direction because of the existence of the concaved parts 11b on both sides in the width direction, as shown in FIGS. 6 and 9. This means that the part of the other height-direction surface f6 adjoining the one length-direction surface f1, and the part of it adjoining the other length-direction surface f2, have a width Wa which is smaller than the width W of the one height-direction surface f5, and that the minimum width of the length-direction center part of the other height-direction surface f6, or width Wb, is smaller than the width Wa.

Also, the edges along both of the width-direction sides of the length-direction center part of the other height-direction surface f6 continue steplessly, respectively, to the edges along both of the width-direction sides of the two parts of width Wa that are present on both sides in the length direction, and are constituted by inwardly concaving curved lines. It should be noted that the symbol D1 in FIG. 6 represents the width-direction dimension from the one width-direction surface f3 or other width-direction surface f4 of the capacitor body 11 to the part of the other height-direction surface f6 corresponding to the width Wa, or specifically (W−Wa)/2. Also, the symbol D2 in FIG. 6 represents the width-direction dimension from the one width-direction surface f3 or other width-direction surface f4 of the capacitor body 11 to the location of the other height-direction surface f6 corresponding to the width Wb, or specifically (W−Wb)/2.

As shown in FIGS. 7A through 9, the capacitor body 11 has a built-in capacitive part (no symbol) comprising multiple first internal electrode layers 14 and multiple second internal electrode layers 15 stacked alternately in the width direction with a dielectric layer (no symbol) in between. Each first internal electrode layer 14 and each second internal electrode layer 15 have a rectangular shape of roughly equal contour dimension, and the two length-direction sides, two width-direction sides and two height-direction sides (except where the lead parts 14a, 15b described below are present) of the capacitive part are covered with margin parts (no symbol) constituted by dielectric material. Also, each first internal electrode layer 14 integrally has a lead part 14a of rectangular shape on its side proximal to the other height-direction surface f6 at a position close to the one length-direction surface f1, where the edge of each lead part 14a is exposed on the other height-direction surface f6 near the one length-direction surface f1 where the width is Wa. Furthermore, each second internal electrode layer 15 integrally has a lead part 15a of rectangular shape whose contour dimension is roughly equal to that of the lead part 14a, on its side proximal to the other height-direction surface f6 at a position close to the other length-direction surface f2, where the edge of each lead part 15a is exposed on the other height-direction surface f6 near the other length-direction surface f2 where the width is Wa.

Figure 7A:
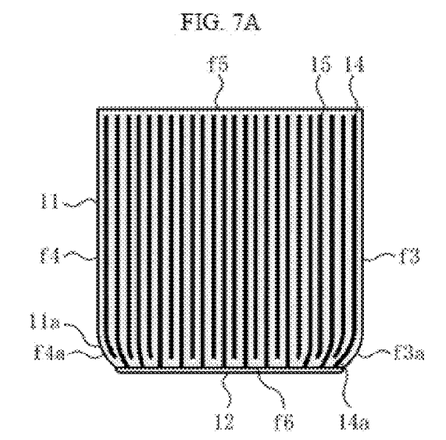
FIG. 7A is a section view of FIG. 4 along line S1-S1.
Figure 7B:
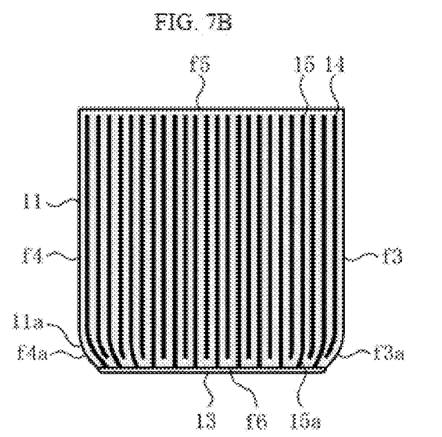
FIG. 7B is a section view of FIG. 4 along line S2-S2.
Figure 7C:
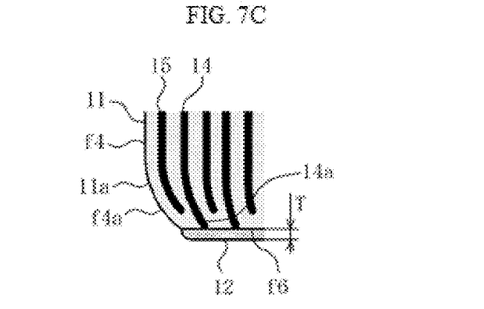
FIG. 7C is a partially enlarged view of FIG. 7A.
Figure 8A:
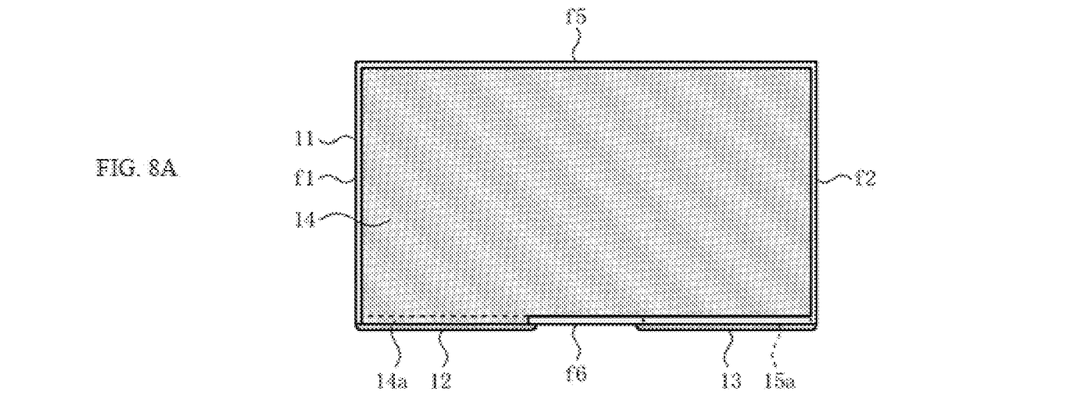
Figure 8B:
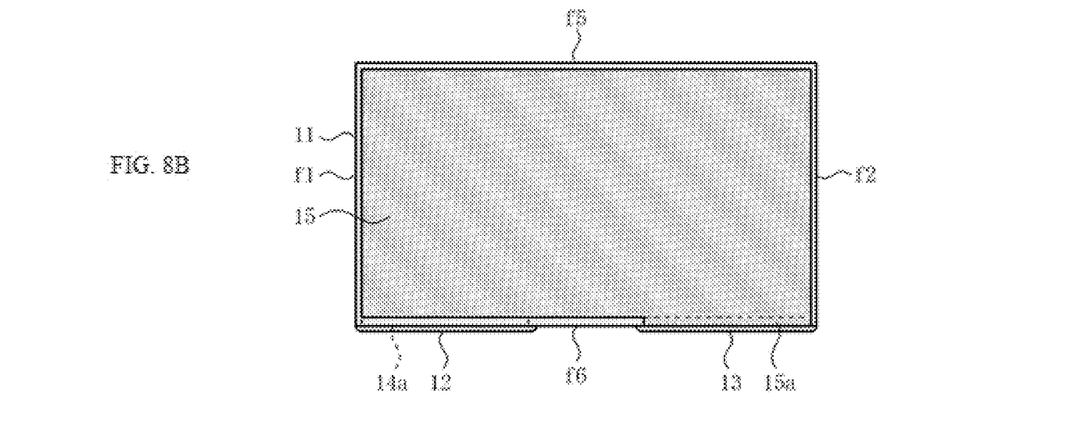
FIG. 8B is a section view of FIG. 5A along line S4-S4.

As shown in FIGS. 7A, 7B, and 7C, among the first internal electrode layers 14, several first internal electrode layers 14 close to the width-direction outer surfaces f3a, f4a of the tapered part 11a are inwardly curved in such a way that their part (including the lead part 14a) close to the other height-direction surface f6 corresponds to the shape of the width-direction outer surface f3a or f4a. Also, among the second internal electrode layers 15, several second internal electrode layers 15 close to the width-direction outer surfaces f3a, f4a of the tapered part 11a are inwardly curved in such a way that their part (including the lead part 15a) close to the other height-direction surface f6 corresponds to the shape of the width-direction outer surface f3a or f4a. More specifically, respective parts (including the lead parts 14a and 15a, respectively) of the first internal electrode layer 14 and second internal electrode layer 15 closest to the width-direction outer surfaces f3a, f4a are inwardly curved, where close to the other height-direction surface f6, in the same manner as with the shapes of the width-direction outer surfaces f3a, f4a, while respective parts (including the lead parts 14a and 15a, respectively) of the first internal electrode layers 14 and second internal electrode layers 15 on the inner side are inwardly curved, where close to the height-direction surface f6, at gradually decreasing degrees of curvature toward the inner side.

In addition, the lead parts 14a of those several first internal electrode layers 14, among the first internal electrode layers 14, which are close to the width-direction outer surfaces f3a, f4a of the tapered part 11a, respectively, are inwardly curved, where close to the respective concaved parts 11b, in a manner corresponding to the shapes of the respective concaved parts 11b, as shown in FIG. 9. Also, the lead parts 15a of those several second internal electrode layers 15, among the second internal electrode layers 15, which are close to the width-direction outer surfaces f3a, f4a of the tapered part 11a, respectively, are inwardly curved, where close to the respective concaved parts 11b, in a manner corresponding to the shapes of the respective concaved parts 11b. More specifically, parts of the lead parts 14a, 15a closest to the width-direction outer surfaces f3a, f4a, respectively, are inwardly curved, where close to the respective concaved parts 11b, in the same manner as with the shapes of the respective concaved parts 11b, while parts of the lead parts 14a, 15a on the inner side, respectively, are inwardly curved, where close to the respective concaved parts 11b, at gradually decreasing degrees of bending toward the inner side.

As shown in FIGS. 4 through 8B, the first external electrode 12 is provided at the part of the other height-direction surface f6 of the capacitor body 11 near the one length-direction surface f1 where the width is Wa, in a manner covering the entire surface of this part, while the second external electrode 13 is provided at the part of the other height-direction surface f6 of the capacitor body 11 near the other length-direction surface f2 where the width is Wa, in a manner covering the entire surface of this part. Also, the exposed part of the lead part 14a of each first internal electrode layer 14 is electrically connected to the first external electrode 12, while the exposed part of the lead part 15a of each second internal electrode layer 15 is electrically connected to the second external electrode 13. Although not illustrated, the first external electrode 12 and second external electrode 13 have a two-layer structure constituted by a base film contacting the part of the other height-direction surface f6 of the capacitor body 11 where the width is Wa, and a surface film contacting the outer side of this base film, or a multilayer structure constituted by a base film, a surface film, and at least one intermediate film in between them.

The aforementioned parts of the capacitor body 11 except for the first internal electrode layers 14 and second internal electrode layers 15 are preferably made of dielectric ceramics of roughly the same composition and roughly the same dielectric constant, and the dielectric layers between the first internal electrode layers 14 and second internal electrode layers 15 have roughly the same thickness. Here, "dielectric ceramics of roughly the same composition and roughly the same dielectric constant" include dielectric ceramics having the same composition and dielectric constant, as well as dielectric ceramics at least one of whose composition and dielectric constant varies, within an allowable range, due to its relationship with the sintering level, etc., while "roughly the same thickness" includes the same thickness as well as varying thicknesses within an allowable range or manufacturing tolerance due to the relationship with the compression level, etc., when stacked. For these dielectric ceramics, preferably dielectric ceramics whose primary constituent is barium titanate, strontium titanate, calcium titanate, magnesium titanate, calcium zirconate, calcium titanate zirconate, barium zirconate, titanium oxide, etc., or more preferably dielectric ceramics of ∈>1000 or Class 2 (high dielectric constant type) can be used.

In addition, the aforementioned base film for the first external electrode 12 and second external electrode 13 is constituted by a baked film, for example, and for this baked film, preferably a good conductor whose primary constituent is nickel, copper, palladium, platinum, silver, gold, or alloy thereof, etc., can be used. The surface film is constituted by a plated film, for example, and for this plated film, preferably a good conductor whose primary constituent is copper, tin, palladium, gold, zinc, or alloy thereof, etc., can be used. The intermediate film is constituted by a plated film, for example, and for this plated film, preferably a good conductor whose primary constituent is platinum, palladium, gold, copper, nickel, or alloy thereof, etc., can be used.

Furthermore, the aforementioned first internal electrode layers 14 and second internal electrode layers 15 are preferably each constituted by a good conductor of roughly the same composition and the first internal electrode layers 14 and second internal electrode layers 15 each have roughly the same thickness. Here, "a good conductor of roughly the same composition" includes a good conductor of the same composition as well as a good conductor whose composition varies, within an allowable range, due to its relationship with the sintering level, etc., while "roughly the same thickness" includes the same thickness as well as varying thicknesses within an allowable range or manufacturing tolerance due to the relationship with the compression level, etc., when stacked. For this good conductor, preferably a good conductor whose primary constituent is nickel, copper, palladium, platinum, silver, gold, or alloy thereof, etc., can be used.

Figure 10A:
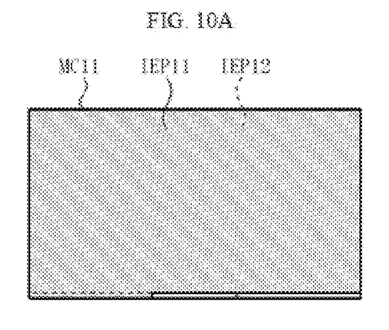
FIGS. 10A and 10B are drawings that explain the first manufacturing method example.
Figure 10B:
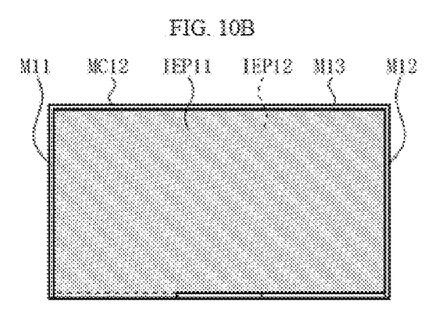
Figure 11:
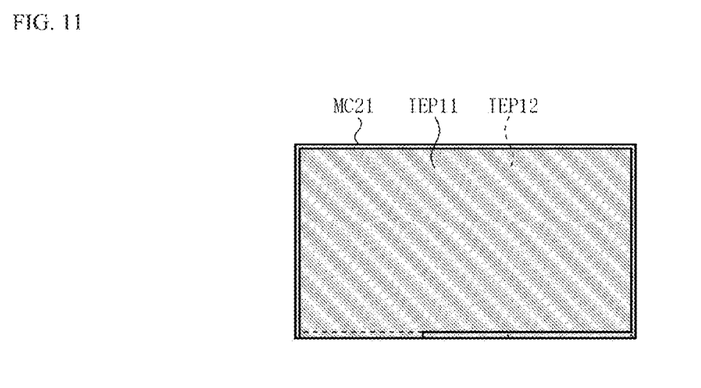
FIG. 11 is a drawing that explains the second manufacturing method example.

Next, two manufacturing method examples suitable for the manufacturing of the aforementioned multilayer ceramic capacitor 10, are explained by using FIGS. 10 and 11 as deemed appropriate.

First Manufacturing Method Example

For the manufacturing, a ceramic slurry containing dielectric ceramic powder, and an electrode paste containing good conductor powder, are prepared. Next, the ceramic slurry is coated on the surface of a carrier film and then dried to prepare a first green sheet, and also the electrode paste is printed on the surface of this first green sheet and then dried to prepare a second green sheet on which internal electrode patterns have been formed.

Next, unit sheets taken from the first green sheet are stacked and then thermo-compression bonded, and this operation is repeated until a specified number of sheets is reached, to prepare an area corresponding to one margin part in the width direction.

Next, unit sheets (including internal electrode patterns) taken from the second green sheet are stacked and then thermo-compression bonded, and this operation is repeated until a specified number of sheets is reached, to prepare an area corresponding to the capacitive part. Next, unit sheets taken from the first green sheet are stacked and then thermo-compression bonded, and this operation is repeated until a specified number of sheets is reached, to prepare an area corresponding to the other margin part in the width direction. Lastly, all of the stacks are thermo-compression bonded for the last time to prepare an unsintered laminated sheet. In this manufacturing process of an unsintered laminated sheet, a concave that will become the tapered part 11a and concaved part 11b, shown in FIGS. 4 through 6, is formed at specified positions on the unsintered laminated sheet by, for example, using an elastic sheet for compression-bonding made of synthetic rubber, etc., whose thickness or shape is changed accordingly.

Next, the unsintered laminated sheet is cut in grids to prepare laminated chips MC11 whose section view is shown in FIG. 10A. The symbol IEP11 in FIG. 10A indicates an internal electrode pattern corresponding to the first internal electrode layer 14 shown in FIG. 8A, while the symbol IEP12 indicates an internal electrode pattern corresponding to the second internal electrode layer 15 shown in FIG. 8B. It should be noted that the cut laminated chips MC11 do not have the margin parts on both sides in the length direction and the margin part on one side in the height direction. In other words, in this cutting process of the unsintered laminated sheet, the unsintered laminated sheet is cut in such a way that the margin parts on both sides in the length direction and the margin part on one side in the height direction are not formed.

Next, the margin parts M11 to M13 shown in section view in FIG. 10B are formed on both sides in the length direction and one side in the height direction of each laminated chip MC11 whose section view is shown in FIG. 10A, using either the method of attaching the sheets prepared beforehand using the ceramic slurry, or the method of dip-coating and then drying the ceramic slurry, to prepare an unsintered chip MC12.

Next, multiple unsintered chips MC12 whose section view is shown in FIG. 10 (B) are sintered (including binder removal and sintering) together in an ambience and at a temperature profile suitable for the dielectric ceramic powder contained in the ceramic slurry and also for the good conductor powder contained in the electrode paste, to prepare sintered chips each corresponding to the capacitor body 11 shown in FIGS. 4 through 6.

Next, the multiple sintered chips are barrel-polished together to have their corners and ridge lines rounded, to prepare the capacitor body 11 shown in FIGS. 4 through 6.

Next, the other height-direction surface f6 of the capacitor body 11 shown in FIGS. 4 through 6 is dip-coated in an electrode paste (this electrode paste may be the same as the aforementioned electrode paste, or it may be another electrode paste containing a different type of good conductor powder) and the paste is dried, and then baked, to form a base film for the first external electrode 12 and for the second external electrode 13. Next, a surface film covering the base film, or an intermediate film and a surface film, is/are formed by means of plating to prepare the first external electrode 12 and the second external electrode 13 as shown in FIGS. 4 through 6.

Second Manufacturing Method Example

For the manufacturing, a ceramic slurry containing dielectric ceramic powder, and an electrode paste containing good conductor powder, are prepared. Next, the ceramic slurry is coated on the surface of a carrier film and then dried to prepare a first green sheet, and also the electrode paste is printed on the surface of this first green sheet and then dried to prepare a second green sheet on which internal electrode patterns have been formed.

Next, unit sheets composed of the first green sheet are stacked and then thermo-compression bonded, and this operation is repeated until a specified number of sheets is reached, to prepare an area corresponding to one margin part in the width direction.

Next, unit sheets (including internal electrode patterns) composed of the second green sheet are stacked and then thermo-compression bonded, and this operation is repeated until a specified number of sheets is reached, to prepare an area corresponding to the capacitive part. Next, unit sheets taken from the first green sheet are stacked and then thermo-compression bonded, and this operation is repeated until a specified number of sheets is reached, to prepare an area corresponding to the other margin part in the width direction. Lastly, all of the stacks are thermo-compression bonded for the last time to prepare an unsintered laminated sheet. In this manufacturing process of unsintered laminated sheet, a concave that will become the tapered part 11*a* and concaved part 11*b*, shown in FIGS. 4 through 6, is formed at specified positions on the unsintered laminated sheet by, for example, using an elastic sheet for compression-bonding made of synthetic rubber, etc., whose thickness or shape is changed accordingly.

Next, the unsintered laminated sheet is cut in grids to prepare unsintered chips MC21 whose section view is shown in FIG. 11. The symbol IEP11 in FIG. 11 indicates an internal electrode pattern corresponding to the first internal electrode layer 14 shown in FIG. 8A, while the symbol IEP12 indicates an internal electrode pattern corresponding to the second internal electrode layer 15 shown in FIG. 8B. It should be noted that the cut unsintered chips MC21 have the margin parts on both sides in the length direction and the margin part on one side in the height direction. In other words, in this cutting process of the unsintered laminated sheet, the unsintered laminated sheet is cut in such a way that the margin parts on both sides in the length direction and the margin part on one side in the height direction are formed.

Next, multiple unsintered chips MC21 whose section view is shown in FIG. 11 are sintered (including binder removal and sintering) together in an ambience and at a temperature profile suitable for the dielectric ceramic powder contained in the ceramic slurry and also for the good conductor powder contained in the electrode paste, to prepare sintered chips each corresponding to the capacitor body 11 shown in FIGS. 4 through 6.

Next, the multiple sintered chips are barrel-polished together to have their corners and ridge lines rounded, to prepare the capacitor body 11 shown in FIGS. 4 through 6.

Next, the other height-direction surface f6 of the capacitor body 11 shown in FIGS. 4 through 6 is dip-coated in an electrode paste (this electrode paste may be the same as the aforementioned electrode paste, or it may be another electrode paste containing a different type of good conductor powder) and the paste is dried, and then baked, to form a base film for the first external electrode 12 and for the second external electrode 13. Next, a surface film covering the base film, or an intermediate film and a surface film, is/are formed by means of plating to prepare the first external electrode 12 and the second external electrode 13 as shown in FIGS. 4 through 6.

Next, conditions where the forming positions and contour shapes of the first external electrode 12 and second external electrode 13 differ from the ideal forming positions and contour shapes (refer to FIG. 6), respectively, or specifically conditions that correspond to the five conditions AP6 through AP10 explained using FIGS. 3A through 3D, respectively, are explained using FIGS. 12A through 12E. It should be noted that, while FIGS. 12A through 12E illustrate the first external electrode 12 alone for the purpose of convenience, the modes in which the forming position and contour shape of the second external electrode 13 differ are the same as those shown in FIGS. 12A through 12E. Also, FIGS. 12A through 12E are drawn in such a way that the exposed part (refer to the bold line) of each lead part 104*a* is visible from the outside of the first external electrode 12 for the purpose of convenience. Furthermore, while the contour shape of the first external electrode 12 in FIGS. 12A through 12E matches the contour shape of the first external electrode 12 shown in FIG. 6 for the purpose of convenience, it goes without saying that each contour shape may differ from the contour shape of the first external electrode 12 shown in FIG. 6.

Figure 12A:
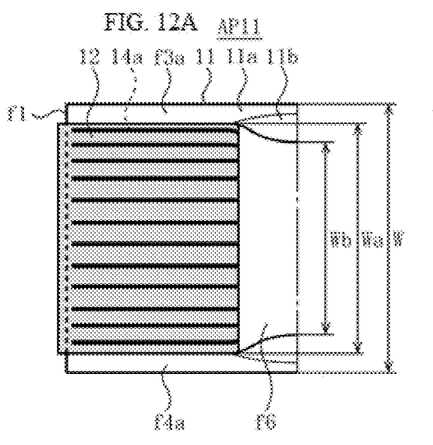
FIGS. 12A through 12E are drawings (corresponding to those of FIGS. 3A through 3D) that explain conditions where the forming positions and contour shapes of the first external electrode and second external electrode differ from the ideal forming positions and contour shapes, respectively.
Figure 12B:
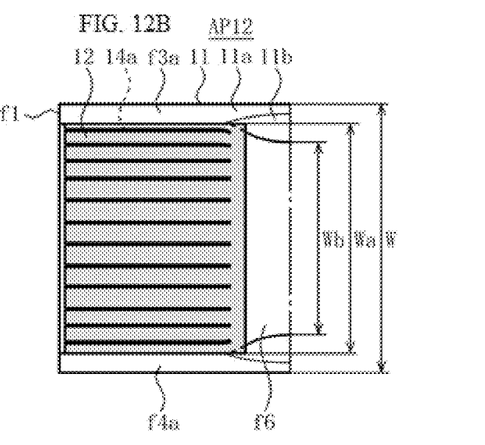
Figure 12C:
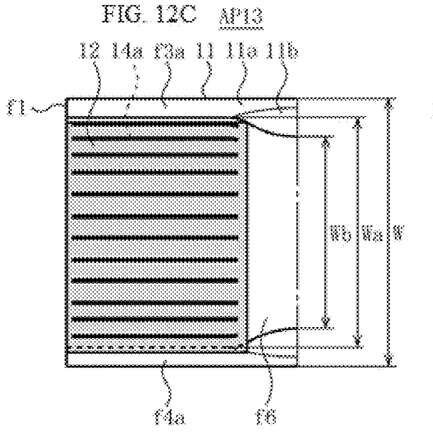
Figure 12D:
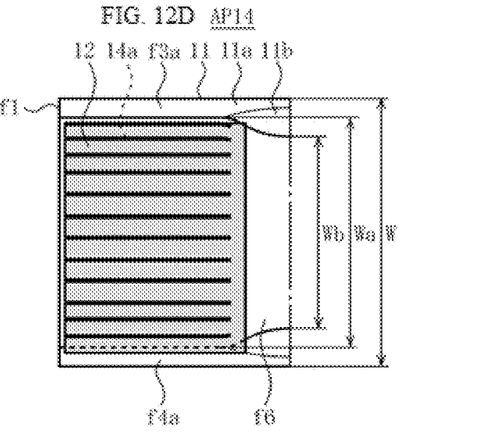
Figure 12E:
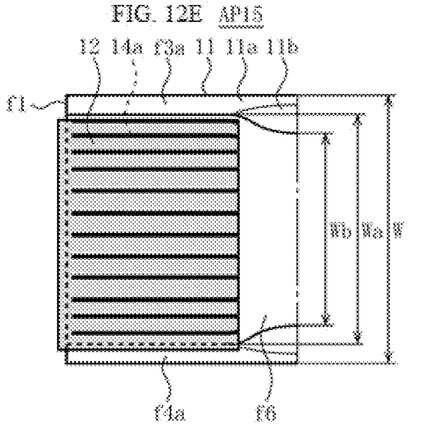

FIG. 12A shows a condition AP11 where the first external electrode 12 is displaced slightly outward in the length direction but the exposed parts of all lead parts 14*a* are covered by the first external electrode 12, FIG. 12B shows a condition AP12 where the first external electrode 12 is displaced slightly inward in the length direction but the exposed parts of all lead parts 14*a* are covered by the first external electrode 12, FIG. 12C shows a condition AP13 where the first external electrode 12 is displaced slightly outward in the width direction but the exposed parts of all lead parts 14*a* are covered by the first external electrode 12, FIG. 12D shows a condition AP14 where the first external electrode 12 is displaced slightly inward in the length direction and outward in the width direction but the exposed parts of all lead parts 14*a* are covered by the first external electrode 12, and FIG. 12E shows a condition AP15 where the first external electrode 12 is displaced slightly outward in the length direction and also outward in the width direction but the exposed parts of all lead parts 14*a* are covered by the first external electrode 12.

As before, an appearance inspection of the forming positions and contour shapes of the first external electrode 12 and second external electrode 13 formed on the other height-direction surface f6 of the capacitor body 11, respectively, is performed using an image-processing apparatus. In the appearance inspection, those samples with the exposed parts of all lead parts 14*a*, 15*a* not covered by the first external electrode 12 and second external electrode 13, respectively, are found defective, while those samples whose first external electrode 12 and second external electrode 13 are projecting outward from at least one of the judgment criterion length and width, respectively, are found defective. It should be noted that, with the capacitor body 11 shown in FIGS. 4 through 6, where the width Wa of the other height-direction surface f6 is smaller than the width W of the one height-direction surface f5, the criterion length and criterion width of the latter correspond to the length L and width W of the one height-direction surface f5.

This means that, of the five conditions AP11 through AP15 explained using FIGS. 12A through 12E, the condition AP12 (refer to FIG. 12B) is found non-defective because neither the first external electrode 12 nor second external electrode 13 is projecting outward from either one of the criterion length L and criterion width W. The condition AP11 (refer to FIG. 12A) is found defective because the first external electrode 12 and second external electrode 13 are projecting slightly outward from the criterion length L, respectively. The condition AP13 (refer to FIG. 12C) is found non-defective because, although the first external electrode 12 and second external electrode 13 are projecting slightly outward from the width Wa, respectively, they are not projecting outward from the criterion width W. The condition AP14 (refer to FIG. 12D) is found non-defective because, although the first external electrode 12 and second external electrode 13 are projecting slightly outward from the width Wa, respectively, they are not projecting outward from the criterion width W. The condition AP15 (refer to FIG. 12E) is found defective because the first external electrode 12 and second external electrode 13 are projecting slightly outward from the criterion length L, respectively.

This means that, of the four conditions AP11 and AP13 through AP15 that are extremely unlikely to present problems in function and in use, the condition AP13 (refer to FIG. 12C) and condition AP14 (refer to FIG. 12D) can be found non-defective in the appearance inspection, which in turn improves yield and helps reduce cost.

Next, the effects achieved by the multilayer ceramic capacitor 10 are explained.

(1) With the multilayer ceramic capacitor 10, the fact that its first external electrode 12 and second external electrode 13 are provided on the other height-direction surface f6 of the capacitor body 11, prevents, to the maximum extent possible, the external dimensions of the capacitor body 11 from being limited by the first external electrode 12 and second external electrode 13, compared to when the external electrodes have an L-shape, horizontal U-shape, quadrangular cylinder shape with bottom, or the like. This means that, even when the external dimensions of the multilayer ceramic capacitor 10 are small, the capacitor body 11 can be designed with the maximum possible external dimensions, which in turn allows the contour dimensions of the first internal electrode layer 14 and second internal electrode layer 15 to increase, respectively, thereby increasing the facing area of the internal electrode layers and achieving a larger capacitance as a result.

(2) With the multilayer ceramic capacitor 10, the width Wa of the other height-direction surface f6 of the capacitor body 11 is smaller than the width W of the one height-direction surface f5. This means that, when an appearance inspection of the forming positions and contour shapes of the first external electrode 12 and second external electrode 13 formed on the other height-direction surface f6 is performed, setting the projection judgment criterion width to the width W of the one height-direction surface f5 allows the condition AP13 (refer to FIG. 12C) and condition AP14 (refer to FIG. 12D) to be found non-defective in the appearance inspection among the four conditions AP11 and AP13 through AP15 where at least one of the first external electrode 12 and second external electrode 13 is projecting slightly outward from the other height-direction surface f6 of the capacitor body 11 but the exposed parts of all lead parts 14a, 15a of the first internal electrode layers 14 and second internal electrode layers 15 are covered by the first external electrode 12 and second external electrode 13, respectively. This means that, of the four conditions AP11 and AP13 through AP15 that are extremely unlikely to present problems in function and in use, the condition AP13 and condition AP14 can be found non-defective in the appearance inspection, which in turn improves yield and helps reduce cost.

(3) With the multilayer ceramic capacitor 10, a tapered part 11a whose width gradually decreases toward the other height-direction surface f6 over the entire part in the length direction is provided at a position adjoining the other height-direction surface f6 of the capacitor body 11. In other words, a capacitor body 11 where the width Wa of its other height-direction surface f6 is smaller than the width W of its one height-direction surface f5 can be obtained without significant distortion of the shape of the capacitor body 11.

(4) With the ceramic capacitor 10, the width-direction outer surfaces f3a, f4a of the tapered part 11a are each constituted by a surface that continues steplessly to the one width-direction surface f3 or other width-direction surface f4 of the capacitor body 11. This means that concerns for cracking, chipping, etc., resulting from concentration of stress on any step that may exist between the width-direction outer surface f3a or f4a of the tapered part 11a and the one width-direction surface f3 or other width-direction surface f4 of the capacitor body 11, can be eliminated.

(5) With the multilayer ceramic capacitor 10, the width-direction outer surfaces f3a, f4a of the tapered part 11a are each constituted by an outwardly bulging curved surface. In other words, drop in the strength of the tapered part 11a of the capacitor body 11 can be prevented to the maximum extent possible, compared to when the width-direction outer surfaces f3a, f4a are each constituted by an inwardly concaving curved surface.

(6) With the multilayer ceramic capacitor 10, a concaved part 11b that extends from midway through the width-direction outer surface f3a or f4a in the height direction to the other height-direction surface f6, is provided at the length-direction center of the width-direction outer surface f3a and also at the length-direction center of the width-direction outer surface f4a, of the tapered part 11a. In other words, the other height-direction surface f6 of the capacitor body 11 can be shaped like an hourglass with a constricted center in the length direction, and this constriction can be utilized to increase the recognition accuracy of the forming positions and contour shapes of the first external electrode 12 and second external electrode 13 in the appearance inspection.

(7) With the multilayer ceramic capacitor 10, each concaved part 11b is constituted by a curved surface that steplessly continues to the width-direction outer surface f3a or f4a of the tapered part 11a. This means that the concerns for cracking, chipping, etc., resulting from concentration of stress on any step that may exist between each concaved part 11b and the width-direction outer surface f3a or f4a of the tapered part 11a, can be eliminated.

Next, the verified results of the aforementioned effects, especially the verified results of yield improvement, are explained.

For the verification, 100 evaluation multilayer ceramic capacitors corresponding to the multilayer ceramic capacitor 10 were manufactured. The evaluation multilayer ceramic capacitors were manufactured according to the <First Manufacturing Method Example> described above, and their specifications (all values are reference dimensions in design that do not include tolerance) are as follows:

The multilayer ceramic capacitor is 1200 μm long, 700 μm wide, and 700 μm high. (The length is indicated by L in FIG. 4, width is indicated by W in FIGS. 5A and 5B, and height is indicated by H in FIG. 4.)

The capacitor body is 1200 μm long, 700 μm wide, and 685 μm high. (The capacitor body is indicated by 11 in FIG. 4, its length is indicated by L in FIG. 4, width is indicated by W in FIGS. 5A and 5B, and height is indicated by H-T in FIG. 4.)

The primary constituent of the capacitor body, except for the first internal electrode layers and second internal electrode layers, is barium titanate. (The first internal electrode layers are indicated by 14 in FIGS. 7A through 7C, and second internal electrode layers are indicated by 15 in FIGS. 7A through 7C.)

The first internal electrode layer and second internal electrode layer, except for the lead parts, have a length-direction dimension of 1170 μm and height-direction dimension of 650 μm, and the respective lead parts have a length-direction dimension of 435 μm and height-direction dimension of 20 μm. (The lead parts are indicated by 14a and 15a in FIGS. 8A and 8B.)

The primary constituent of the first internal electrode layer and second internal electrode layer is nickel, each layer is 0.5 μm thick, and the number of layers is 335 each.

The dielectric layer present between the first internal electrode layer and second internal electrode layer is 0.5 μm thick.

The height-direction dimension of the tapered part of the capacitor body is 120 μm, and the radius of curvature of the width-direction outer surface of the tapered part is 120 μm. (The tapered part is indicated by 11a in FIG. 4, height-direction dimension is indicated by Ha in FIG. 4, and width-direction outer surface is indicated by f3a or f4a in FIGS. 5A and 5B.)

The other height-direction surface of the capacitor body is 600 μm wide on the wider side and 500 μm wide on the narrower side. (The other height-direction surface is indicated by f6 in FIG. 6, its width on the wider side is indicated by Wa in FIG. 6, width on the narrower side is indicated by Wb in FIG. 6, and D1 in FIG. 6 is 50 μm and D2 in FIG. 6 is 100 μm.)

The margin parts on both sides of the capacitor body in the length direction are 15 μm thick, margin parts on both sides in the width direction are 15 μm thick, margin part on one side in the height direction is 15 μm thick, and margin part on the other side in the height direction is 20 μm thick. (The one side in the height direction corresponds to the top side in FIGS. 8A and 8B, and the other side in the height direction corresponds to the bottom side in FIGS. 8A and 8B.)

The first external electrode and second external electrode have a length-direction dimension of 470 μm and width-direction dimension of 600 μm. (The first external electrode is indicated by 12 in FIG. 4 and second external electrode is indicated by 13 in FIG. 4.)

The first external electrode and second external electrode have a space of 260 μm between them in the length direction.

The first external electrode and second external electrode have a three-layer structure and are each 15 μm thick, where the base film is primarily constituted by copper and 10 μm thick, the intermediate film is primarily constituted by nickel and 2 μm thick, and the surface film is primarily constituted by tin and 3 μm thick. (The thickness of the first external electrode and that of the second external electrode are each indicated by T in FIGS. 4 and 7C.)

For the verification of effects, a six-side inspection was performed on the 100 evaluation multilayer ceramic capacitors using a chip-component appearance inspection apparatus manufactured by Okano Electric, Co., Ltd., and the numbers of units corresponding to the condition AP11 shown in FIG. 12A, condition AP13 shown in FIG. 12C, condition AP14 shown in FIG. 12D, and condition AP15 shown in FIG. 12E, were obtained, respectively. The obtained results were as follows: there were 6 units corresponding to the condition AP11, 21 units corresponding to the condition AP13, 31 units corresponding to the condition AP14, and 15 units corresponding to the condition AP15. In other words, this confirmed that the yield could be improved by 52% because, of the 100 units, those (21 units) corresponding to the condition AP13 and those (31 units) corresponding to the condition AP14 could be found non-defective.

The following is a supplemental note on the width-direction projections in the aforementioned condition AP13 (refer to FIG. 12C) and condition AP14 (refer to FIG. 12D), respectively, by considering the specifications of the evaluation ceramic capacitor, etc.

With the evaluation multilayer ceramic capacitors, the width-direction projections in the condition AP13 (refer to FIG. 12C) and condition AP14 (refer to FIG. 12D) were 10 to 20 μm, respectively, partly because the width-direction dimension of the first external electrode 12 and that of the second external electrode 13 were 600 μm. Meanwhile, these width-direction projections (10 to 20 μm) did not exceed 50 μm because the differential width-direction dimension (width-direction dimension D1 in FIG. 6) manifesting on both sides in the width direction based on the width W (700 μm) of one height-direction surface, and the width Wa (600 μm) of the other height-direction surface, of the capacitor body 11 was 50 μm. In other words, by using the width-direction dimensions in the condition AP13 and those in the condition AP14 as the base and setting the differential width-direction dimension (width-direction dimension D1 in FIG. 6) manifesting on both sides of the capacitor body 11 in the width direction in such a way that it becomes greater than the maximum value among these width-direction projections, units corresponding to the condition AP13 and condition AP14 can be found non-defective, without fail, in the appearance inspection.

In the present disclosure where conditions and/or structures are not specified, a skilled artisan in the art can readily provide such conditions and/or structures, in view of the present disclosure, as a matter of routine experimentation. Also, in the present disclosure including the examples described above, any ranges applied in some embodiments may include or exclude the lower and/or upper endpoints, and any values of variables indicated may refer to precise values or approximate values and include equivalents, and may refer to average, median, representative, majority, etc. in some embodiments. Further, in this disclosure, "a" may refer to a species or a genus including multiple species, and "the invention" or "the present invention" may refer to at least one of the embodiments or aspects explicitly, necessarily, or inherently disclosed herein. The terms "constituted by" and "having" refer independently to "typically or broadly comprising", "comprising", "consisting essentially of", or "consisting of" in some embodiments. In this disclosure, any defined meanings do not necessarily exclude ordinary and customary meanings in some embodiments.

The present application claims priority to Japanese Patent Application No. 2015-238558, filed Dec. 7, 2015, the disclosure of which is incorporated herein by reference in its entirety including any and all particular combinations of the features disclosed therein.

It will be understood by those of skill in the art that numerous and various modifications can be made without departing from the spirit of the present invention. Therefore, it should be clearly understood that the forms of the present invention are illustrative only and are not intended to limit the scope of the present invention.

I claim:

1. A multilayer ceramic capacitor constituted by a capacitor body of roughly rectangular solid shape constituted by two height-direction surfaces, two width-direction surfaces, and two length-direction surfaces, which capacitor body has a first external electrode and a second external electrode both provided on one of the two height-direction surfaces of the capacitor body, with a space between the first and second electrodes in a length direction, wherein:

the capacitor body has a built-in capacitive part comprising multiple first internal electrode layers and multiple second internal electrode layers stacked alternately in a width direction with dielectric layers in between;

a lead part of each of the multiple first internal electrode layers is exposed on the one of the two height-direction surfaces, with said exposed part connected independently and electrically to the first external electrode;

a lead part of each of the multiple second internal electrode layers is exposed on the one of the two height-direction surfaces, with said exposed part connected independently and electrically to the second external electrode; and a width of the one of the two height-direction surfaces of the capacitor body is smaller than a width of the other of the two height-direction surfaces.

2. A multilayer ceramic capacitor according to claim 1, wherein each of the width-direction surfaces of the capacitor body has, at a position adjoining the one of the two height-direction surfaces, a tapered part whose width gradually decreases toward the one of the two height-direction surfaces over an entire length of the part.

3. A multilayer ceramic capacitor according to claim 2, wherein width-direction outer surfaces of the tapered parts are each constituted by a surface that steplessly continues to each of the two width-direction surfaces of the capacitor body.

4. A multilayer ceramic capacitor according to claim 3, wherein the width-direction outer surfaces of the tapered parts are each constituted by an outwardly bulging curved surface.

5. A multilayer ceramic capacitor according to claim 2, wherein the width-direction outer surfaces of the tapered parts each have, at a center of each tapered part in a length direction, a concaved part that extends from an approximately midpoint of the tapered part in the height direction through the width-direction outer surface to the one of the two height-direction surfaces.

6. A multilayer ceramic capacitor according to claim 3, wherein the width-direction outer surfaces of the tapered parts each have, at a center of each tapered part in a length direction, a concaved part that extends from an approximately midpoint of the tapered part in the height direction through the width-direction outer surface to the one of the two height-direction surfaces.

7. A multilayer ceramic capacitor according to claim 4, wherein the width-direction outer surfaces of the tapered parts each have, at a center of each tapered part in a length direction, a concaved part that extends from an approximately midpoint of the tapered part in the height direction through the width-direction outer surface to the one of the two height-direction surfaces.

8. A multilayer ceramic capacitor according to claim 5, wherein the concaved parts are each constituted by a curved surface that steplessly continues to each of the width-direction outer surfaces.

9. A multilayer ceramic capacitor according to claim 6, wherein the concaved parts are each constituted by a curved surface that steplessly continues to each of the width-direction outer surfaces.

10. A multilayer ceramic capacitor according to claim 7, wherein the concaved parts are each constituted by a curved surface that steplessly continues to each of the width-direction outer surfaces.

\* \* \* \* \*